UNITED STATES PATENT OFFICE.

MAX ENGELMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF MAKING THEOPHYLLIN.

SPECIFICATION forming part of Letters Patent No. 716,994, dated December 30, 1902.

Application filed July 10, 1902. Serial No. 115,059. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD CO., of New York,) have invented a new and useful Improvement in Processes of Making Theophyllin; and I do hereby declare the following to be an exact and clear description of my invention.

I have found that by the action of alkalies upon the monoformyl derivative of 1-3-dimethyl-4-5-diamido-2-6-dioxypyrimidin the alkaline salts of theophyllin are produced, from which salts theophyllin results by a subsequent treatment with acids. The preparation of the monoformyl derivative of 1-3-dimethyl-4-5-diamido-2-6-dioxypyrimidin of the formula

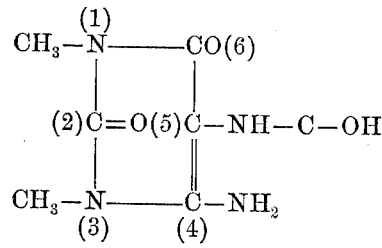

has been described in *Berichte der Deutschen Chemischen Gesellschaft,* Vol. 33, page 3053.

The new reaction takes place at a low temperature. A good yield of theophyllin results on heating the reaction mass for a short time on the water-bath.

The reaction proceeds according to the following equation:

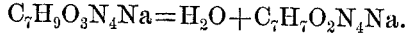

At first the alkaline salts of the formyl derivative are formed, which are then converted into the alkaline salts of theophyllin with the separation of one molecule of water.

The following examples will serve to illustrate the manner in which my invention can be carried into practical effect, (the parts are by weight:)

Example 1: A solution of ten parts of the monoformyl derivative of 1-3-dimethyl-4-5-diamido-2-6-dioxypyrimidin in one hundred parts of hot water is mixed with ten parts of a thirty-per-cent. caustic-soda lye, and the resulting mixture is then heated for about half an hour on the water-bath. The sodium salt of theophyllin thus produced is precipitated from the reaction mass by the addition of an excess of caustic-soda lye or common salt in the shape of a whitish powder. It is filtered off and dried. By the interaction of the sodium salt of theophyllin thus obtained with acids theophyllin possessing the known properties results.

Example 2: In a vessel provided with a reflux condenser ten parts of the monoformyl derivative of 1-3-dimethyl-4-5-diamido-2-6-dioxypyrimidin are mixed with one hundred parts of a three-per-cent. solution of potassium hydroxid in ethyl alcohol, and the resulting mixture is then heated on the water-bath for about one hour. The potassium salt of theophyllin precipitated during the reaction in the shape of a whitish powder is filtered off and dried. Theophyllin results therefrom by treatment with acids.

Of course one can also employ a solution of potassium or sodium in absolute alcohol.

Having now described my invention and in what manner the same is to be performed, what I claim as new, and desire to secure by Letters Patent, is—

The process for the production of theophyllin, which process consists in first treating the monoformyl derivative of 1-3-dimethyl-4-5-diamido-2-6-dioxypyrimidin with alkalies and then transforming the alkaline salts of theophyllin thus produced into theophyllin by the action of acids, substantially as hereinbefore described.

In testimony whereof I have signed my name in the presence of two subscribing witnesses.

MAX ENGELMANN.

Witnesses:
OTTO KÖNIG,
T. A. RITTERSHAUS.